(12) United States Patent
Shenouda

(10) Patent No.: US 12,316,090 B2
(45) Date of Patent: May 27, 2025

(54) TEMPERATURE SENSOR FOR ARC DETECTION

(71) Applicant: Pratt & Whitney Canada Corp., Québec (CA)

(72) Inventor: Antwan Shenouda, Mississauga (CA)

(73) Assignee: PRATT & WHITNEY CANADA CORP., Québec (CA)

( * ) Notice: Subject to any disclaimer, the term of this patent is extended or adjusted under 35 U.S.C. 154(b) by 0 days.

(21) Appl. No.: 18/180,565

(22) Filed: Mar. 8, 2023

(65) Prior Publication Data

US 2024/0305085 A1    Sep. 12, 2024

(51) Int. Cl.
*H02H 1/00* (2006.01)
*G01K 7/02* (2021.01)
*H01H 33/26* (2006.01)

(52) U.S. Cl.
CPC ........... *H02H 1/0023* (2013.01); *G01K 7/021* (2013.01); *H01H 33/26* (2013.01)

(58) Field of Classification Search
CPC ....... H02H 1/0023; G01K 7/021; H01H 33/26
USPC .......................................................... 361/42
See application file for complete search history.

(56) References Cited

U.S. PATENT DOCUMENTS

| | | | |
|---|---|---|---|
| 4,658,322 A | 4/1987 | Rivera | |
| 5,616,968 A * | 4/1997 | Fujii | H02J 7/0071 307/66 |
| 6,210,036 B1 * | 4/2001 | Eberle | H01R 13/6683 337/2 |
| 8,054,594 B2 * | 11/2011 | Wu | H02H 1/0023 361/42 |
| 10,193,331 B2 | 1/2019 | Kilroy et al. | |
| 10,948,551 B2 * | 3/2021 | Thomas | G01R 31/69 |
| 11,062,588 B2 | 7/2021 | Galin et al. | |
| 11,721,981 B2 | 8/2023 | Galin et al. | |
| 2008/0025372 A1 * | 1/2008 | Culbertson | G01K 7/023 374/185 |

(Continued)

FOREIGN PATENT DOCUMENTS

| | | |
|---|---|---|
| CA | 2869805 C | 5/2017 |
| EP | 3487014 A1 | 5/2019 |
| EP | 4194867 A1 | 6/2023 |

OTHER PUBLICATIONS

Extended European Search Report for EP Application No. 24161832.1, dated Sep. 30, 2024, pp. 1-7.

*Primary Examiner* — Thienvu V Tran
*Assistant Examiner* — Sreeya Sreevatsa
(74) *Attorney, Agent, or Firm* — CANTOR COLBURN LLP

(57) ABSTRACT

An arc detection assembly is provided and includes first and second conductors including first and second terminal ends, respectively, which are engageable to form an electrical connection and a temperature sensing system. The temperature sensing system includes a temperature sensor disposed in contact with one of the first and second terminal ends and configured to sense a temperature of the one of the first and second terminal ends and a temperature monitoring circuit. The temperature monitoring circuit is coupled to the temperature sensor and configured to determine when the temperature sensor senses an increase in temperature of the one of the first and second terminal ends and to determine whether the increase in temperature is indicative of an arcing condition of the electrical connection.

15 Claims, 4 Drawing Sheets

(56) References Cited

U.S. PATENT DOCUMENTS

| | | | |
|---|---|---|---|
| 2008/0225445 A1* | 9/2008 | Cheng | H02H 1/0023 |
| | | | 361/2 |
| 2009/0253281 A1* | 10/2009 | Eichhorst | H01R 9/24 |
| | | | 439/251 |
| 2014/0043714 A1* | 2/2014 | Benke | H02H 3/10 |
| | | | 361/42 |
| 2018/0227133 A1* | 8/2018 | Yang | H04L 12/10 |
| 2020/0381874 A1* | 12/2020 | Rose | H01R 13/111 |
| 2021/0063437 A1* | 3/2021 | Polonsky | G01R 19/32 |
| 2023/0231372 A1 | 7/2023 | Sarraf et al. | |

\* cited by examiner

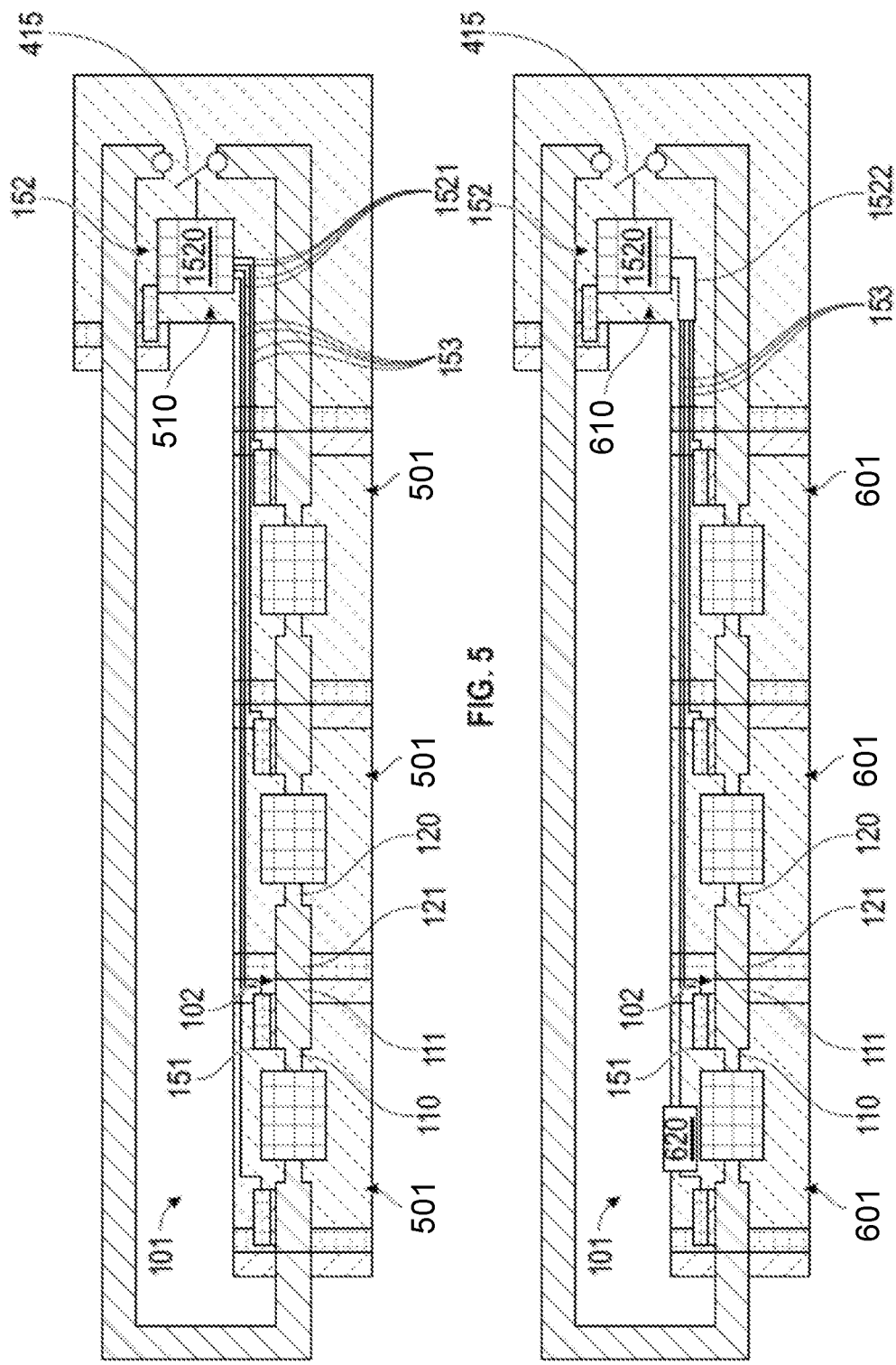

TEMPERATURE SENSOR FOR ARC DETECTION

BACKGROUND

The present disclosure relates to arc detection and, in particular, to a temperature sensor for arc detection.

An arc fault is a high-power discharge of electricity between two or more conductors. This discharge generates heat, which can break down the wire's insulation and trigger an electrical fire. Arc faults can range in current from a few amps up to thousands of amps, and are highly variable in strength and duration.

SUMMARY

According to an aspect of the disclosure, an arc detection assembly is provided and includes first and second conductors including first and second terminal ends, respectively, which are engageable to form an electrical connection and a temperature sensing system. The temperature sensing system includes a temperature sensor disposed in contact with one of the first and second terminal ends and configured to sense a temperature of the one of the first and second terminal ends and a temperature monitoring circuit. The temperature monitoring circuit is coupled to the temperature sensor and configured to determine when the temperature sensor senses an increase in temperature of the one of the first and second terminal ends and to determine whether the increase in temperature is indicative of an arcing condition of the electrical connection.

In accordance with additional or alternative embodiments, the first and second terminal ends are engageable in at least one of a pin-and-socket formation and a terminal lug formation.

In accordance with additional or alternative embodiments, the temperature sensor includes a thermally conductive element disposed in contact with the one of the first and second terminal ends and a temperature sensing element disposed in contact with the thermally conductive element and configured to sense the temperature of the one of the first and second terminal ends via the thermally conductive element.

In accordance with additional or alternative embodiments, the temperature sensing element includes at least one of a resistance temperature detector (RTD) and a thermocouple.

In accordance with additional or alternative embodiments, the temperature monitoring circuit includes a controller configured to identify and interrupt a current causing the arcing condition and to issue a warning that the arcing condition occurred and an electrical device configured to open a circuit carrying the current responsive to an interrupt signal issued by the controller.

In accordance with additional or alternative embodiments, the temperature monitoring circuit includes one or more cables routed along and through at least one of the first and second conductors and by which the temperature sensor and the temperature monitoring circuit are communicative.

In accordance with additional or alternative embodiments, the temperature monitoring circuit includes one or more cables routed along an exterior of at least one of the first and second conductors and by which the temperature sensor and the temperature monitoring circuit are communicative.

According to an aspect of the disclosure, an arc detection assembly is provided and includes electrical connection elements and a temperature sensing system. Each electrical connection element includes first and second conductors including first and second terminal ends, respectively, which are engageable to form an electrical connection. The temperature sensing system includes temperature sensors, each disposed in contact with one of the first and second terminal ends of each electrical connection element and configured to sense a temperature thereof, a temperature monitoring circuit coupled to each temperature sensor and configured to determine when any of the temperature sensors senses an increase in temperature of the one of the first and second terminal ends and to determine whether the increase in temperature is indicative of an arcing condition of the corresponding electrical connection and one or more cables routed along at least one of the first and second conductors of each electrical connection element and by which each temperature sensor and the temperature monitoring circuit are communicative.

In accordance with additional or alternative embodiments, the first and second terminal ends in at least one of the electrical connections are engageable in at least one of a pin-and-socket formation and a terminal lug formation.

In accordance with additional or alternative embodiments, each temperature sensor includes a thermally conductive element disposed in contact with the one of the first and second terminal ends and a temperature sensing element disposed in contact with the thermally conductive element and configured to sense the temperature of the one of the first and second terminal ends via the thermally conductive element. The temperature sensing element includes at least one of a resistance temperature detector (RTD) and a thermocouple.

In accordance with additional or alternative embodiments, the temperature monitoring circuit includes a controller configured to identify and interrupt a current causing the arcing condition and to issue a warning that the arcing condition occurred and an electrical device configured to open a circuit carrying the current responsive to an interrupt signal issued by the controller.

In accordance with additional or alternative embodiments, the one or more cables are routed along and through the at least one of the first and second conductors.

In accordance with additional or alternative embodiments, the temperature monitoring circuit includes one or more cables routed along an exterior of the at least one of the first and second conductors.

According to an aspect of the disclosure, an arc detection assembly is provided and includes electrical connection elements and a temperature sensing system. Each electrical connection element includes first and second conductors including first and second terminal ends, respectively, which are engageable to form an electrical connection. The temperature sensing system includes temperature sensors, each disposed in contact with one of the first and second terminal ends of each electrical connection element and configured to sense a temperature thereof and a temperature monitoring circuit coupled to each temperature sensor and configured to determine when any of the temperature sensors senses an increase in temperature of the one of the first and second terminal ends and to determine whether the increase in temperature is indicative of an arcing condition of the corresponding electrical connection.

In accordance with additional or alternative embodiments, the first and second terminal ends in at least one of the electrical connections are engageable in at least one of a pin-and-socket formation and a terminal lug formation.

In accordance with additional or alternative embodiments, each temperature sensor includes a thermally conductive element disposed in contact with the one of the first and second terminal ends and a temperature sensing element disposed in contact with the thermally conductive element and configured to sense the temperature of the one of the first and second terminal ends via the thermally conductive element. The temperature sensing element includes at least one of a resistance temperature detector (RTD) and a thermocouple.

In accordance with additional or alternative embodiments, the temperature monitoring circuit includes a controller configured to identify and interrupt a current causing the arcing condition and to issue a warning that the arcing condition occurred and an electrical device configured to open a circuit carrying the current responsive to an interrupt signal issued by the controller.

In accordance with additional or alternative embodiments, the temperature sensing system includes fiber optic cables each connected to a corresponding one of the sensors and each of the fiber optic cables is routed along at least one of the corresponding first and second conductors.

In accordance with additional or alternative embodiments, each of the sensors is communicative with a unique channel of the temperature monitoring circuit by way of the corresponding one of the fiber optic cables.

In accordance with additional or alternative embodiments, each of the sensors is communicative with the temperature monitoring circuit by way of the corresponding one of the fiber optic cables and each of the fiber optic cables is connected to a same channel of the temperature monitoring circuit and comprises an electrical element configured to identify the corresponding one of the sensors to the temperature monitoring circuit.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIG. 5 is a schematic side view of the arc detection assembly of FIG. 1 with multiple electrical connections in a pin-and-socket formation and a fiber optic cable in accordance with embodiments; and FIG. 6 is a schematic side view of the arc detection assembly of FIG. 1 with multiple electrical connections in a pin-and-socket formation and multiple fiber optic cables in accordance with embodiments.

DETAILED DESCRIPTION

Figure 1:
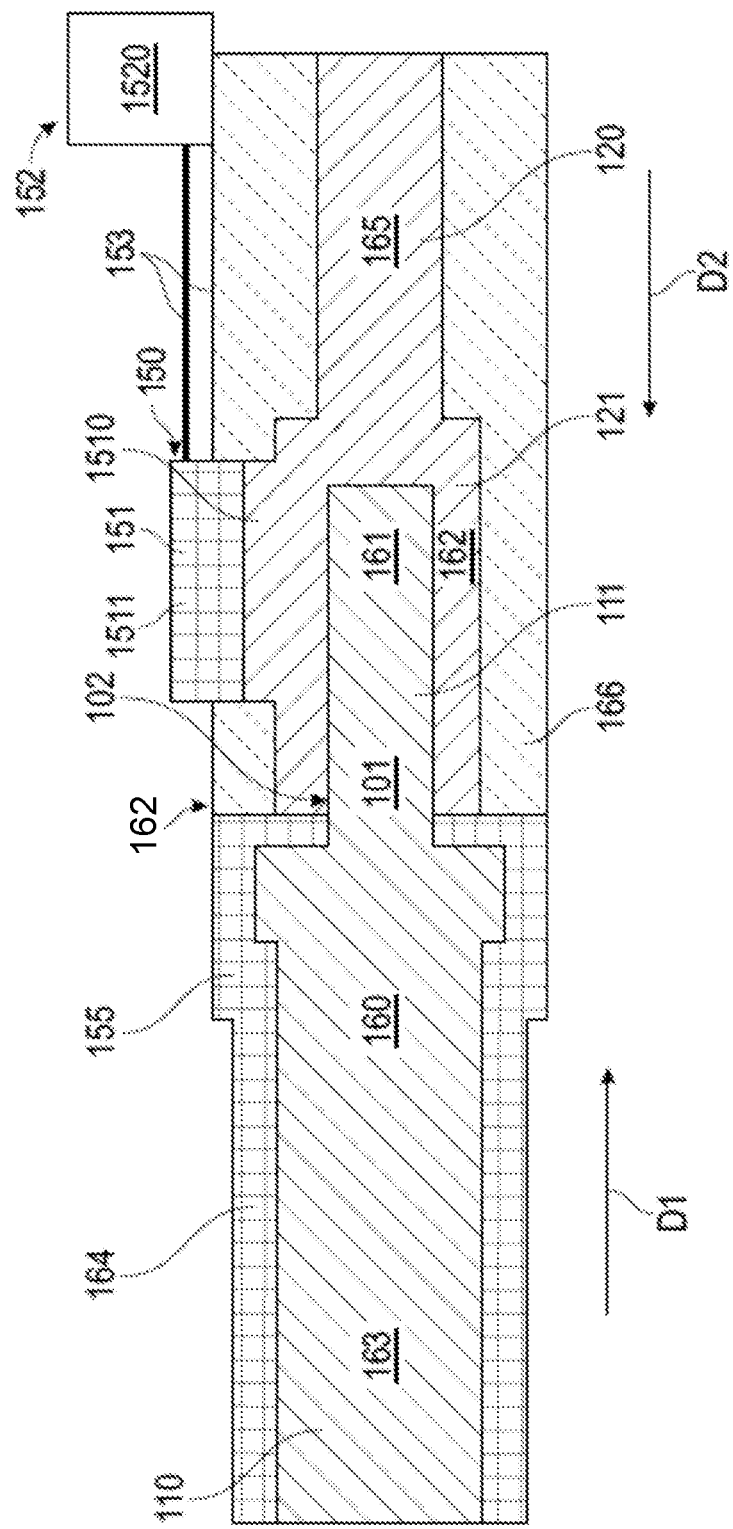
FIG. 1 is a schematic side view of an arc detection assembly and a pin-and-socket formation in accordance with embodiments.

A parallel arc occurs when electricity intermittently jumps a gap between wires of different voltages, such as line-to-line (i.e., two hot conductors of different phases), line-to-neutral or line-to-ground. An example of what may cause a parallel arc is contamination that bridges the gap between two parallel lines of different voltages, or if damage occurs on the insulation of two parallel lines carrying different voltages, where the damaged lines are close enough together, an arc may occur between the exposed wires. Since parallel arcs occur between conductors at different voltages, the amount of current can vary widely, from very little to a very high amount up to the short circuit current available for that circuit. A series arc occurs when electricity intermittently jumps a gap between two or more points within the same phase. An example of what may cause a series arc is when a pin and socket connection are not tightly fit, or connection may intermittently break due to vibration, etc.

An airgap distance that an arc can jump depends on the voltage and the altitude (resulting air pressure). The lower the altitude, and the higher the voltage, the larger the distance that the arc can jump.

Arcs can also occur when a nonconductive medium, such as air, breaks down and creates an electrical path from a high energy source and a lower energy sink. An AC arc can be cleared easier than a DC gap because the current and voltage are forced to go through zero multiple times a second (depending on the frequency). DC arcs can be sustained at much larger distances from the original distance at formation because a conductive channel is formed once the arc is created.

Current methods of arc detection include electromagnetic interference (EMI) detection, audio detection, current signature analysis and optical detection. The present methods generally attempt to isolate an arc signature (audio, optical, EMI or current) from the surrounding environment. This can prove to be very difficult for high voltage/power lines because the current flowing in the cables and the surrounding equipment can contribute significant noise. For example, the current in a conductor driving a motor can be very noisy electrically because of multiple factors, such as high-power switching. Optical detection methods suffer from the fact that, while light travels in straight lines, light is relatively easily attenuated. As such, optical detection methods often require multiple optical sensors and a completely dark environment to be able to detect arcing.

Therefore, there remains a need for simple and reliable methods and systems for detecting high impedance arcing.

Thus, as will be described below, arc detection in a semi-enclosed or enclosed space, such as an electronic box or a terminal box, is provided by an addition of a temperature sensing system to potential arc sources. This allows for the detection of parallel arcs as well as serial arcs, which occur between serially connected conductors and which are often very difficult to detect.

With reference to FIG. 1, an arc detection assembly 101 is provided and includes a first conductor 110 that includes a first terminal end 111, a second conductor 120 that includes a second terminal end 121 and a temperature sensing system 150. An enclosure 155 can be formed to fully or at least partially enclose a space in which the first and second terminal ends 111 and 121 are engageable with one another to form an electrical connection 102 by which current is conducted from the first conductor 110 to the second conductor 120 (or vice versa; for purposes of clarity and brevity, unless otherwise noted, the following description will relate to cases in which current is conducted from the first conductor 110 to the second conductor 120).

The temperature sensing system 150 is configured to sense, detect and, in some cases, mitigate an arcing condition occurring between the first conductor 110 and the second conductor 120. In particular, the temperature sensing system 150 is configured to sense, detect and, in some cases, mitigate an arcing condition occurring between the first terminal end 111 and the second terminal end 121 as the first and second terminal ends 111 and 121 engage to form the electrical connection 102 or while the first and second terminal ends 111 and 121 are engaged.

As used herein, an "arcing condition" is either an arc or a condition in which an arc is about to or is likely to occur. In either case, the temperature sensing system 150 is configured to sense an increase in local temperatures that are or would be associated with an arc or an arc condition. In the case of the arc being about to or likely to occur, it is to be understood that an arc is often preceding by an instance of an increased local impedance. This increased local impedance can be sensed by the temperature sensing system 150.

The temperature sensing system 150 includes a temperature sensor 151, a temperature monitoring circuit 152 and one or more cables 153. The temperature sensor 151 is disposable proximate to an engagement of the first and second terminal ends 111 and 121 such that a temperature increase due to arcing is felt and sensed by the temperature sensor 151. The temperature sensor 151 can include a thermally conductive element 1510 and a temperature sensing element 1511. The thermally conductive element 1510 is disposable in contact with the one of the first and second terminal ends 111 and 121 and can be formed of highly thermally conductive material. The temperature sensing element 1511 is disposable in contact with the thermally conductive element 1510 and configured to sense the temperature of the one of the first and second terminal ends 111 and 121 via the thermally conductive element 1510 (i.e., the thermally conductive element 1510 conducts thermal energy from the one of the first and second terminal ends 111 and 121 to the temperature sensing element 1511. The temperature monitoring circuit 152 is operably coupled to and communicative with the temperature sensor 151 by way of the one or more cables 153. The one or more cables 153 can be routed along and, in some cases, through at least one of the first and second conductors 110 and 120. In other cases, the one or more cables can be routed along an exterior of the first and second conductors 110 and 120. The temperature monitoring circuit 152 is configured to determine when the temperature sensor 151 senses an increase in temperature of the one of the first and second conductors 110 and 120 and/or the first and second terminal ends 111 and 121 and to determine whether the increase in temperature is indicative of an arc of the electrical connection 102. The temperature monitoring circuit 152 can include a controller 1520. The controller 1520 can include a memory unit, a processor and an input/output (I/O) unit by which the processor is communicative with the temperature sensor 151 and with an external device. The memory unit has executable instructions stored thereon, which are to be read and executed by the processor. When the executable instructions are read and executed by the processor, the processor is caused to operate as described herein.

When an arc occurs or is about to occur between the first and second conductors 110 and 120 and/or between the first and second terminal ends 111 and 121, the arc or potential arc (i.e., local impedance) tends to increase a temperature of the various components in and around the electrical connection 102 and the temperature sensor 151 senses this temperature increase caused by the arc or the potential arc. A signal is generated by the temperature sensor 151 periodically according to a schedule or in response to a possible arcing incident and travels along the one or more cables 153 from the temperature sensor 151 to the temperature monitoring circuit 152. The temperature monitoring circuit 152 receives the signal and (the processor of the controller 1520) analyzes the signal. The analysis is to determine when/whether the temperature sensor 151 senses an increase in temperature of the one of the first and second terminal ends 111 and 121 and, if so, to determine whether the increase in temperature is indicative of an arc of the electrical connection 102. If it is determined that the signal is indicative of a non-arcing event, the controller 1520 of the temperature monitoring circuit 152 may take no action. If it is determined that the signal is indicative of an arcing event, the controller 1520 of the temperature monitoring circuit 152 may take one or more actions. These include, but are not limited to, identifying a current that is responsible for causing the arc (i.e., by identifying the temperature sensor 151 and recognizing that the temperature sensor 151 may be associated with a given current), interrupting the current and issuing a warning that the arc occurred to the external device or to an operator for example.

Figure 2:
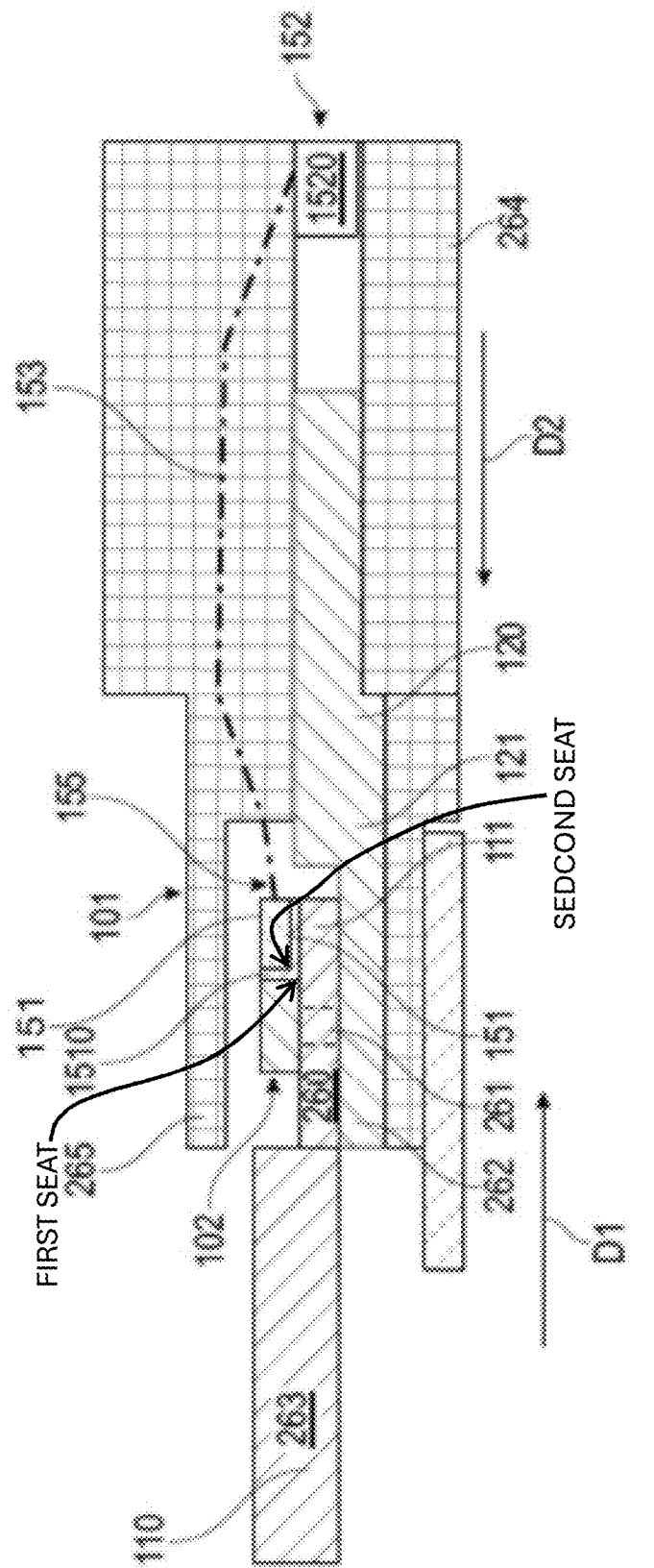
FIG. 2 is a schematic side view of an arc detection assembly and a bolt and busbar combination formation in accordance with embodiments.

With continued reference to FIG. 1 and with additional reference to FIG. 2, the first and second terminal ends 111 and 121 can be engageable in at least one of a pin-and-socket formation 160 (see FIG. 1) and a terminal lug formation 260 (see FIG. 2).

As shown in FIG. 1, the pin-and-socket formation 160 can be characterized in that the first terminal end 111 is provided as one or more pins 161 and in that the second terminal end 121 is provided as one or more sockets 162 (for purposes of clarity and brevity, the following description will relate to the case in which the first terminal end 111 is provided as a single pin 161 and the second terminal end 121 is provided as a single socket 162). The pin 161 extends from a connector element 163 (i.e., the first conductor 110) in a first direction D1 and the connector element 163 includes an outer sheath 164. The socket 162 extends from a cable 165 (i.e., the second conductor 120) in a second direction D2, which is opposite the first direction D1. The cable 165 can include an outer sheath 166 as well. The socket 162 is formed to tightly fit around the pin 161. In this case, the temperature sensor 151 can be disposable such that the thermally conductive element 1510 is disposed proximate to or in direct thermal contact with the socket 162. The one or more cables 153 can be routed from the temperature sensing element 1511 around an exterior of the outer sheath 166.

As shown in FIG. 2, the terminal lug formation 260 can be characterized in that the first terminal end 111 is provided as a terminal lug 261 and in that the second terminal end 121 is provided as a bolt and busbar combination 262 in which a bolt secures the terminal lug 261 to a busbar so that the terminal lug 261 is electrically connected with at least the busbar. The terminal lug 261 extends from a cable 263 (i.e., the first conductor 110) in a first direction D1. The bolt and busbar combination 262 is electrically connected to an electronic unit 264 (i.e., the second conductor 120) and in a second direction D2, which is opposite the first direction D1. A backshell 265 generally surrounds the terminal lug 261 and the bolt and busbar combination 262. In this case, the temperature sensor 151 can be disposable such that the thermally conductive element 1510 is disposed proximate to or in direct thermal contact with the bolt and busbar combination 262. The one or more cables 153 can be routed from the temperature sensing element 1511.

Figure 3:
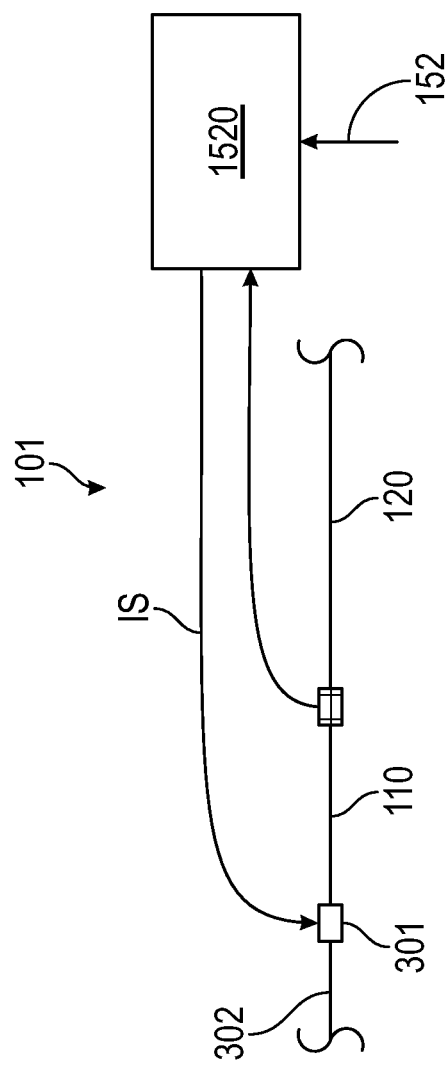
FIG. 3 is a circuit diagram including a controller and an electrical device of an arc detection assembly in accordance with embodiments.

With reference to FIG. 3, with the controller 1520 of the temperature monitoring circuit 152 being configured to identify and interrupt a current causing the arcing condition and to issue a warning that the arcing condition occurred, the arc detection assembly 101 can further include an electrical device 301. The electrical device 301 can include or be provided as a contactor, a relay, a switch, etc. In any case, the electrical device 301 is configured to open a circuit 302 carrying the current in response to an interrupt signal IS issued by the controller 152.

The following further descriptions of the arc detection assembly 101 will generally relate to the embodiments of FIG. 1 in which the first and second terminal ends 111 and 121 are engageable in the pin-and-socket formation 160 and elements and features that have already been described will not be re-described in detail. This is being done for purposes of clarity and brevity.

Figure 4:
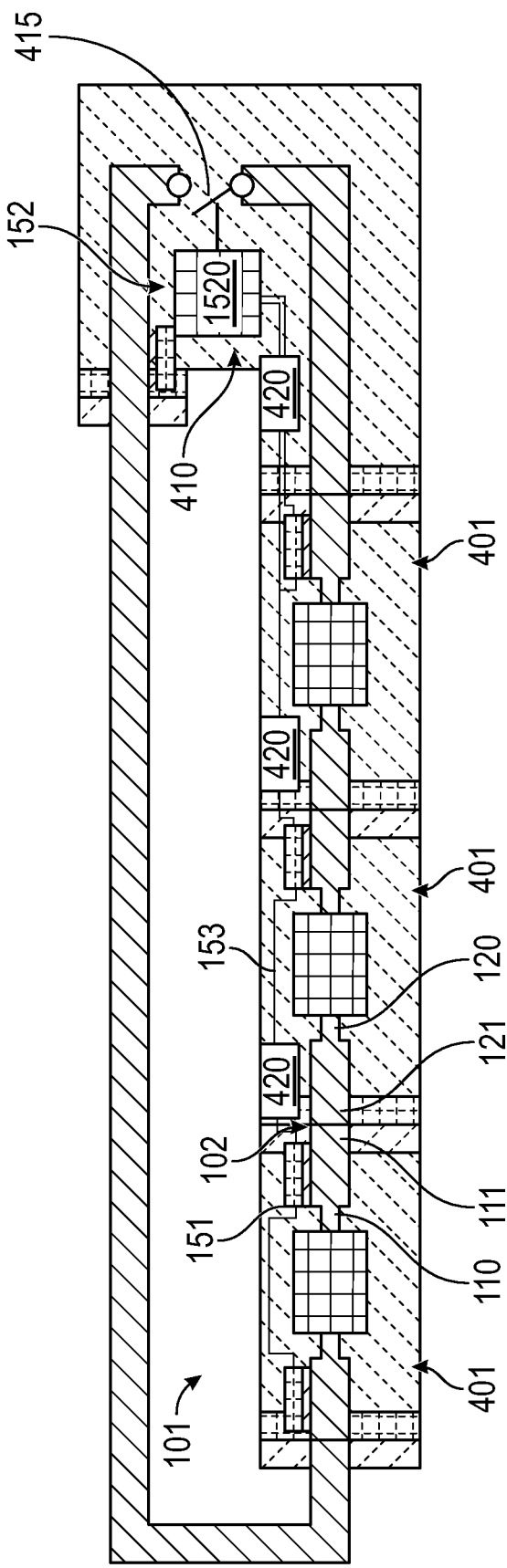
FIG. 4 is a schematic side view of the arc detection assembly of FIG. 1 with multiple electrical connections in a pin-and-socket formation in accordance with embodiments.

With reference to FIG. 4, the arc detection assembly 101 can include multiple electrical connection elements 401, a temperature sensing system 410 and an electrical device 415 that is similar to the electrical device 301 of FIG. 3. Each of the multiple electrical connection elements 401 includes first and second conductors 110 and 120 that each include first and second terminal ends 111 and 121, respectively, which are engageable to form an electrical connection 102. The temperature sensing system 410 includes temperature sensors 151 of each electrical connection element 401, a temperature monitoring circuit 152 and one or more cables 153. The temperature monitoring circuit 152 is coupled to each of the temperature sensors 151 and is configured to determine when/whether any of the temperature sensors 151 senses or is about to sense an increase in temperature of the one of the first and second terminal ends 111 and 121 and to determine whether the increase in temperature is indicative of an arc of the corresponding electrical connection 102. The one or more cables 153 can be routed along (i.e., through or at an exterior of) at least one of the first and second conductors 110 and 120 of each of the electrical connection elements 401. Each of the temperature sensors 151 and the temperature monitoring circuit 152 are communicative by way of the one or more cables 153.

As shown in FIG. 4, the arc detection assembly 101 can further include electrical elements 420 that are electrically interposed between the one or more cables 153 and a corresponding one of the temperature sensors 151. Each of the electrical elements 420 can be provided as a filter or a similar device and is configured to identify the corresponding one of the temperature sensors 151 to the temperature monitoring circuit 152 and the controller 1520.

With reference to FIG. 5, the arc detection assembly 101 can include multiple electrical connection elements 501 and a temperature sensing system 510. Each of the multiple electrical connection elements 501 includes first and second conductors 110 and 120 that each include first and second terminal ends 111 and 121, respectively, which are engageable to form an electrical connection 102. The temperature sensing system 510 includes temperature sensors 151 of each electrical connection element 501, a temperature monitoring circuit 152 and one or more cables 153. The temperature monitoring circuit 152 is coupled to each of the temperature sensors 151 and is configured to determine when/whether any of the temperature sensors 151 senses or is about to sense an increase in temperature of the one of the first and second terminal ends 111 and 121 and to determine whether the increase in temperature is indicative of an arc of the corresponding electrical connection 102. Each of the one or more cables 153 can be routed along (i.e., through or at an exterior of) at least one of the first and second conductors 110 and 120 of each of the electrical connection elements 501. Each of the temperature sensors 151 and the temperature monitoring circuit 152 are communicative by way of the one or more cables 153. As shown in FIG. 5, each of the temperature sensors 151 is communicative with a unique channel 1521 of the controller 1520 of the temperature monitoring circuit 152 by way of the corresponding one or more cables 153.

With reference to FIG. 6, the arc detection assembly 101 can include multiple electrical connections 601 and a temperature sensing system 610. Each of the multiple electrical connections 601 includes first and second conductors 110 and 120 that each include first and second terminal ends 111 and 121, respectively, and that are engageable to form an electrical connection 102. The temperature sensing system 610 includes temperature sensors 151 of each electrical connection element 601, a temperature monitoring circuit 152 and one or more cables 153. The temperature monitoring circuit 152 is coupled to each of the sensors 151 and is configured to determine when/whether any of the temperature sensors 151 senses or is about to sense an increase in temperature of the one of the first and second terminal ends 111 and 121 and to determine whether the increase in temperature is indicative of an arc of the corresponding electrical connection 102. The one or more cables 153 can be routed along (i.e., through or at an exterior of) at least one of the first and second conductors 110 and 120 of each of the electrical connection elements 601. Each of the one or more cables 153 is connected to a same channel 1522 of the controller 1520 of the temperature monitoring circuit 152 and includes an electrical element 620 that is configured to identify the corresponding one of the sensors 151 to the controller 1520 by operating in a similar manner as the electrical elements 420 described above (see FIG. 4). Only one electrical element 620 is shown in FIG. 6 for clarity and brevity.

Technical effects and benefits of the present disclosure are the provision of arc detection in enclosures in various technologies including, but not limited to, aerospace technologies, industrial boxes, electric vehicles (e.g., trains, boats, submarines, road vehicles and flying vehicles). The arc detection provides herein offers an essential solution in the development of electric and hybrid aircraft to a safety concern that is raised when high-voltages are used especially at high altitudes.

The corresponding structures, materials, acts, and equivalents of all means or step-plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. An arc detection assembly, comprising:
   multiple pairs of first and second conductors comprising first and second terminal ends, respectively, which are engageable to form multiple electrical connections; and
   a temperature sensing system comprising:
   temperature sensors each of which is respectively disposed in contact with one of the first and second terminal ends of each of the multiple electrical connections and configured to sense a temperature of the one of the first and second terminal ends; and
   a temperature monitoring circuit coupled to each of the temperature sensors and comprising a controller configured to determine when any of the temperature sensors senses an increase in temperature of the one of the first and second terminal ends and to determine whether the increase in temperature is indicative of an arcing condition of the corresponding one of the multiple electrical connections,
   wherein the temperature monitoring circuit further comprises cables, each of which is routed from a corresponding one of the multiple electrical connections and through each respective interior of each intervening one of the first conductors and through each respective interior of each intervening one of the second conductors to the controller and by which each of the temperature sensors of each of the multiple electrical connections and the controller are communicative.

2. The arc detection assembly according to claim 1, wherein the first and second terminal ends of each of the multiple electrical connections are engageable in a terminal lug formation characterized in that:
   the first terminal end is provided as a terminal lug,
   the second terminal end is provided as a bolt and busbar combination in which a bolt secures the terminal lug to a busbar to electrically connect the terminal lug and the busbar and to form a first seat,
   wherein:
   the terminal lug formation comprises a backshell surrounding the terminal lug and the bolt and busbar combination,
   the corresponding one of the temperature sensors comprises a thermally conductive element proximate to or in direct thermal contact with the bolt and busbar combination, and
   the thermally conductive element is seated in the first seat and comprises a vertical component and a horizontal component forming a second seat in which a temperature sensor is seated.

3. The arc detection assembly according to claim 1, wherein, for each of the multiple electrical connections, the corresponding one of the temperature sensors comprises:
   a thermally conductive element disposed in contact with the one of the first and second terminal ends; and
   a temperature sensing element disposed in contact with the thermally conductive element and configured to sense the temperature of the one of the first and second terminal ends via the thermally conductive element.

4. The arc detection assembly according to claim 3, wherein the temperature sensing element comprises at least one of a resistance temperature detector (RTD) and a thermocouple.

5. The arc detection assembly according to claim 1, wherein:
   the controller is further configured to identify and interrupt a current causing the arcing condition and to issue a warning that the arcing condition occurred, and
   the temperature monitoring circuit further comprises an electrical device configured to open a circuit carrying the current responsive to an interrupt signal issued by the controller.

6. An arc detection assembly, comprising:
   electrical connection elements, each comprising:
   first and second conductors comprising first and second terminal ends, respectively, which are engageable to form an electrical connection; and
   a temperature sensing system comprising:
   temperature sensors, each disposed in contact with one of the first and second terminal ends of each electrical connection element and configured to sense a temperature thereof; and
   a temperature monitoring circuit coupled to each temperature sensor and comprising:
   a controller configured to determine when any of the temperature sensors senses an increase in temperature of the one of the first and second terminal ends and to determine whether the increase in temperature is indicative of an arcing condition of the corresponding electrical connection; and
   cables routed from a corresponding one of the electrical connection elements along and through each respective interior of each intervening one of the first conductors and through each respective interior of each intervening one of the second conductors of each electrical connection element to the controller and by which each temperature sensor of each electrical connection element and the controller are communicative.

7. The arc detection assembly according to claim 6, wherein the first and second terminal ends of each of the electrical connection elements are engageable in a terminal lug formation characterized in that:
   the first terminal end is provided as a terminal lug,
   the second terminal end is provided as a bolt and busbar combination in which a bolt secures the terminal lug to a busbar to electrically connect the terminal lug and the busbar and to form a first seat,
   wherein:
   the terminal lug formation comprises a backshell surrounding the terminal lug and the bolt and busbar combination,
   the temperature sensor comprises a thermally conductive element proximate to or in direct thermal contact with the bolt and busbar combination, and
   the thermally conductive element is seated in the first seat and comprises a vertical component and a horizontal component forming a second seat in which a temperature sensor is seated.

8. The arc detection assembly according to claim 6, wherein, for each of the electrical connection elements, the corresponding temperature sensor comprises:
   a thermally conductive element disposed in contact with the one of the first and second terminal ends; and
   a temperature sensing element disposed in contact with the thermally conductive element and configured to sense the temperature of the one of the first and second terminal ends via the thermally conductive element, wherein the temperature sensing element comprises at least one of a resistance temperature detector (RTD) and a thermocouple.

9. The arc detection assembly according to claim 6, wherein:

the controller is further configured to identify and interrupt a current causing the arcing condition and to issue a warning that the arcing condition occurred, and the temperature monitoring circuit further comprises an electrical device configured to open a circuit carrying the current responsive to an interrupt signal issued by the controller.

10. An arc detection assembly, comprising:

electrical connection elements, each comprising:

first and second conductors comprising first and second terminal ends, respectively, which are engageable to form an electrical connection; and a temperature sensing system comprising:

temperature sensors, each disposed in contact with one of the first and second terminal ends of each electrical connection element and configured to sense a temperature thereof; and a temperature monitoring circuit coupled to each temperature sensor and comprising:

a controller configured to determine when any of the temperature sensors senses an increase in temperature of the one of the first and second terminal ends and to determine whether the increase in temperature is indicative of an arcing condition of the corresponding electrical connection; and fiber optic cables routed from a corresponding one of the electrical connection elements along and through each respective interior of each intervening one of the first conductors and through each respective interior of each intervening one of the second conductors of each electrical connection element to the controller and by which each temperature sensor of each electrical connection element and the controller are communicative.

11. The arc detection assembly according to claim 10, wherein the first and second terminal ends of each of the electrical connection elements are engageable in a terminal lug formation characterized in that:

the first terminal end is provided as a terminal lug, the second terminal end is provided as a bolt and busbar combination in which a bolt secures the terminal lug to a busbar to electrically connect the terminal lug and the busbar and to form a first seat, wherein:

the terminal lug formation comprises a backshell surrounding the terminal lug and the bolt and busbar combination, the temperature sensor comprises a thermally conductive element proximate to or in direct thermal contact with the bolt and busbar combination, and the thermally conductive element is seated in the first seat and comprises a vertical component and a horizontal component forming a second seat in which a temperature sensor is seated.

12. The arc detection assembly according to claim 10, wherein, for each of the electrical connection elements, the corresponding temperature sensor comprises:

a thermally conductive element disposed in contact with the one of the first and second terminal ends; and a temperature sensing element disposed in contact with the thermally conductive element and configured to sense the temperature of the one of the first and second terminal ends via the thermally conductive element, wherein the temperature sensing element comprises at least one of a resistance temperature detector (RTD) and a thermocouple.

13. The arc detection assembly according to claim 10, wherein:

the controller is further configured to identify and interrupt a current causing the arcing condition and to issue a warning that the arcing condition occurred, and the temperature monitoring circuit further comprises an electrical device configured to open a circuit carrying the current responsive to an interrupt signal issued by the controller.

14. The arc detection assembly according to claim 10, wherein each of the temperature sensors is communicative with a unique channel of the controller by way of the corresponding one of the fiber optic cables.

15. The arc detection assembly according to claim 10, wherein:

each of the temperature sensors is communicative with the controller by way of the corresponding one of the fiber optic cables, and each of the fiber optic cables is connected to a same channel of the controller and comprises an electrical element configured to identify the corresponding one of the temperature sensors to the temperature monitoring circuit.

* * * * *